US006802209B2

(12) United States Patent
Joos et al.

(10) Patent No.: US 6,802,209 B2
(45) Date of Patent: Oct. 12, 2004

(54) METHOD AND DEVICE FOR CALIBRATING A PRESSURE SENSOR

(75) Inventors: Klaus Joos, Walheim (DE); Jens Wolber, Gerlingen (DE); Thomas Frenz, Noerdlingen (DE); Hansjoerg Bochum, Novi, MI (US); Matthias Kuesell, Leonberg (DE); Markus Amler, Leonberg-Gebersheim (DE)

(73) Assignee: Robert Bosch GmbH, Stuttgart (DE)

( * ) Notice: Subject to any disclaimer, the term of this patent is extended or adjusted under 35 U.S.C. 154(b) by 126 days.

(21) Appl. No.: 10/182,464

(22) PCT Filed: Jan. 24, 2001

(86) PCT No.: PCT/DE01/00271

§ 371 (c)(1),
(2), (4) Date: Sep. 5, 2002

(87) PCT Pub. No.: WO01/55573

PCT Pub. Date: Aug. 2, 2001

(65) Prior Publication Data

US 2003/0046990 A1 Mar. 13, 2003

(30) Foreign Application Priority Data

Jan. 29, 2000 (DE) ........................................ 100 03 906

(51) Int. Cl.[7] .............................................. G01M 15/00
(52) U.S. Cl. ..................................................... 73/118.1
(58) Field of Search ........................... 73/112, 115, 116, 73/117.2, 117.3, 118.1, 119 R, 119 A; 340/438, 451; 701/29

(56) References Cited

U.S. PATENT DOCUMENTS 5,616,837 A * 4/1997 Leonard et al. ........... 73/119 A
5,633,458 A * 5/1997 Pauli et al. ............... 73/119 A
5,723,780 A * 3/1998 Miwa et al. .............. 73/119 A
5,773,716 A * 6/1998 Antonioli et al. ......... 73/119 A
5,816,220 A * 10/1998 Stumpp et al. ............. 123/435
5,945,596 A * 8/1999 Burkel et al. .............. 73/118.1
6,012,438 A * 1/2000 Joos et al. .................. 123/690
6,308,685 B1 * 10/2001 Becker ........................ 123/456
6,389,901 B1 * 5/2002 Joos et al. ..................... 73/714
6,439,190 B1 * 8/2002 Bochum ...................... 123/295
6,467,461 B1 * 10/2002 Becker ........................ 123/501
2002/0162536 A1 * 11/2002 Steinbrenner ............... 123/446

FOREIGN PATENT DOCUMENTS

| | | |
|---|---|---|
| DE | 195 47 647 | 6/1997 |
| DE | 199 08 411 | 8/2000 |

* cited by examiner

*Primary Examiner*—Eric S. McCall
(74) *Attorney, Agent, or Firm*—Walter Ottesen

(57) ABSTRACT

The invention relates to a method and an arrangement for calibrating a pressure sensor (7) of a fuel-metering system of an internal combustion engine wherein the fuel-metering system includes: a high-pressure pump (2) for pumping fuel from a low-pressure region (ND) into a high-pressure region (HD) injectors (5) for metering the fuel from the high-pressure region (HD) into combustion chambers (6) of the internal combustion engine with the injectors (5) being drivable in dependence upon operating characteristic variables, and the pressure sensor (7) for measuring the pressure in the high-pressure region (HD). To calibrate the pressure sensor (7) so that the offset error is minimized, it is suggested that a pressure, which is present in the high-pressure region (HD), is applied as a reference pressure; that the pressure, which is present in the high-pressure region (HD), is measured as the sensor pressure by the pressure sensor (7); and, that the characteristic line of the pressure sensor (7) is so corrected that the difference of reference pressure and sensor pressure is minimized.

9 Claims, 2 Drawing Sheets

METHOD AND DEVICE FOR CALIBRATING A PRESSURE SENSOR

FIELD OF THE INVENTION

The present invention relates to a method and an arrangement for calibrating a pressure sensor of a fuel-metering system of an internal combustion engine. The fuel-metering system includes: a high-pressure pump for moving fuel from a low-pressure region into a high-pressure region; injectors, which are controllable in dependence upon operating characteristic variables, for metering fuel from the high-pressure region into combustion chambers of the engine; and, the pressure sensor for measuring the pressure in the high-pressure region.

BACKGROUND OF THE INVENTION

The fuel-metering system is, for example, configured as a common-rail fuel direct-injection system with a presupply pump and a high-pressure pump controlled (open loop and/or closed loop) by demand. The presupply pump is, for example, configured as an electric fuel pump and moves fuel from a fuel supply vessel into the low-pressure region of the fuel-metering system. A prepressure of, for example, 4 bar is present in the low-pressure region. The high-pressure pump pumps the fuel from the low-pressure region into a high-pressure store in the high-pressure region of the fuel-metering system. In the high-pressure store, a pressure of 150 to 200 bar is, for example, present for gasoline fuel and a pressure of, for example, 1,500 to 2,000 bar is present for diesel fuel. Several injectors branch from the high-pressure store and, with a corresponding driving control, inject the fuel from the high-pressure store into the combustion chambers of the engine at the injection pressure present at the high-pressure store. The injectors are drivable in dependence upon specific operating characteristic variables. In the high-pressure store, a pressure sensor is furthermore mounted via which the injection pressure, which is present in the high-pressure store, is determined and a corresponding electrical signal is conducted to a control apparatus of the engine. Finally, a pressure control line branches from the high-pressure region of the fuel-metering system and this pressure control line opens via a pressure control valve into the low-pressure region. A low-pressure line branches from the low-pressure region of the fuel supply system and this low-pressure line leads via a low-pressure controller back into the fuel supply vessel.

Pressure sensors, as they are also utilized in fuel-metering systems, conventionally include a static offset error, that is, the zero point is not reliably indicated. An offset error leads to the situation that the measured value of pressure sensors, especially in the low-pressure region, can have large relative deviations to the actual pressure value.

As a rule, a low pressure is present at the starter phase of direct-injecting rail internal combustion engines. The internal combustion engine is mostly started with a low prepressure generated by the presupply pump and, only later is there a switchover to the high pressure. The fuel mass, which is injected into the combustion chambers by the injectors, is greatly dependent upon the injection pressure present in the high-pressure store. For this reason, this injection pressure should be taken into account in the computation of the injection time in the starting phase. Because of the above-described inaccuracies of the pressure sensor (especially at low pressures), the above is, however, mostly not possible. For this reason and according to the state of the art, the start of a direct-injecting engine, as a rule, takes place without considering the actual pressure present in the high-pressure region.

SUMMARY OF THE INVENTION

From the above-mentioned disadvantages of the state of the art, the task of the present invention results to so calibrate a pressure sensor of a fuel-metering system of an internal combustion engine that the offset error is minimized.

Starting from the method of the above-mentioned state of the art, the invention suggests to solve this task in that a pressure, which is present in the high-pressure region, is applied as a reference pressure and that the pressure, which is present in the high-pressure region, is measured as a sensor pressure by the pressure sensor and that the characteristic line of the pressure sensor is corrected in such a manner that the difference of reference pressure and sensor pressure is minimized.

Advantages of the Invention

The offset error exhibits a large scattering from pressure sensor to pressure sensor. For this reason, no generally valid application is possible for minimizing an offset error for pressure sensors; instead, each pressure sensor must be calibrated individually.

Therefore, according to the invention, an adaptation of the sensor characteristic line is carried out individually for each pressure sensor. The method according to the invention is based on the concept that in the measuring range wherein the pressure sensor exhibits the largest offset error, the reference pressure is determined with a higher accuracy than the sensor pressure can be measured by the pressure sensor. When the sensor characteristic line is so corrected that the difference of difference pressure and sensor pressure is minimized (preferably set to equal zero), then it can be assumed that the pressure sensor, which is calibrated in accordance with the method of the invention, has a higher measuring accuracy than a pressure sensor having a non-adapted sensor characteristic line.

According to an advantageous further embodiment of the present invention, it is suggested that, after measuring the sensor pressure with the pressure sensor and before the correction of the characteristic line of the pressure sensor, a check is made as to whether the measured sensor pressure is within pregiven plausibility limits. If the sensor pressure lies outside of the plausibility limit, then it is assumed that the pressure sensor is defective. In this case, an adaptation of the sensor characteristic line serves no purpose and the calibration of the pressure sensor is interrupted and a corresponding fault announcement is outputted.

Various pressures can be applied as a reference pressure. However, a precondition is that the reference pressure can be determined with a higher accuracy than the sensor pressure can be measured by the pressure sensor.

According to a preferred embodiment of the present invention, it is suggested that the pressure in the high-pressure region is generated in that a presupply pump of the fuel-metering system is activated to generate the low pressure in the low-pressure region and the low pressure is conducted into the high-pressure region. In this way, the prepressure, which is generated by the presupply pump, is also present in the high-pressure region of the fuel-metering system.

The low-pressure controller of the fuel-metering system exhibits, for example, an accuracy of approximately ±6% which corresponds to ±240 mbar for a prepressure of approximately 4 bar. A pressure, which is adjusted at the low-pressure controller, can therefore be determined with a higher accuracy than the sensor pressure can be measured by the pressure sensor in the high-pressure region. The pressure, which is present in the low-pressure region, can, for example, be conducted into the high-pressure region via additional pressure compensating lines or by opening connecting lines already present between the low-pressure region and the high-pressure region. As a reference pressure, the pressure can then advantageously be applied which is adjusted at a low-pressure controller of the fuel-metering system in the low-pressure region.

According to a further embodiment of the present invention, it is suggested that the pressure from the low-pressure region is conducted into the high-pressure region through opened inlet valves and outlet valves. The pressure, which is adjusted at a low-pressure controller of the fuel-metering system in the low-pressure region, is applied as a reference pressure while considering the opening pressure of the inlet valves and outlet valves of the high-pressure pump. This embodiment affords the advantage that no additional pressure compensation lines need be provided between the low-pressure region and the high-pressure region; rather, an already present connection between the low-pressure region and the high-pressure region is used via the inlet valves, the high-pressure pump and the outlet valves to conduct the pressure from the low-pressure region into the high-pressure region. The opening pressures of the inlet and outlet valves of the high-pressure pump have an accuracy of likewise approximately ±6% so that the reference pressure can be determined with an accuracy of at least ±500 mbar. For a high-pressure sensor having a measuring range of approximately 150 mbar, this corresponds to an accuracy of approximately ±0.3% with the high-pressure sensor being utilized in a fuel-metering system of a direct-injecting gasoline internal combustion engine. With an accuracy so high, the sensor pressure cannot be determined with the pressure sensor.

Alternatively, and according to a further preferred embodiment of the present invention, it is suggested that the reference pressure be measured by a high-accuracy low-pressure sensor arranged from time to time in the high-pressure region. The low-pressure sensor can, for example, be introduced for the purpose of measuring the reference pressure in the high-pressure region of the fuel-metering system and, after the measurement, can again be removed therefrom. A further possibility is that the low-pressure sensor is fixedly built into the low-pressure region and that, as a reference pressure, the measured value of the low-pressure sensor less the opening pressures of the inlet and outlet valves of the high-pressure pump is used. The low-pressure sensor includes a measuring range of approximately 5 bar. Because of this measuring range, which is limited in comparison to the sensor of the fuel-metering system, relative inaccuracies (in percent) operate relatively less on the absolute value (in bar) of the measured pressure. With the aid of the low-pressure sensor, the reference pressure can thereby be measured with significantly greater accuracy than the sensor pressure can be measured via the pressure sensor.

According to another advantageous embodiment of the present invention, it is suggested that the ambient pressure be applied as a reference pressure. The ambient pressure is, as a rule, present at a significantly higher accuracy than the sensor pressure can be measured by the pressure sensor. The ambient pressure can be measured via a special ambient pressure sensor. After a pregiven time of the engine at standstill, the ambient pressure can be measured via an intake manifold pressure sensor. The ambient pressure can also be inputted manually. The inputted value can, for example, be a value measured at the location or a value which is typical for the location.

As a further advantage of this embodiment according to the invention, an additional diagnostic possibility of the fuel-metering system results. After a completed adaptation of the sensor characteristic line, the presupply pump can be driven so that a prepressure is built up. The prepressure is conducted into the high-pressure region. The pressure, which adjusts in the high-pressure region and especially in the high-pressure store, is measured and is stored as a normal value in a memory of the control apparatus of the internal combustion engine. During operation of the engine, the pressure, which adjusts for a longer initial running of the presupply pump in the high-pressure region, is compared to the stored normal value. In the event that the pressure and the normal value deviate from each other beyond a pregiven limit value, then a conclusion as to a fault in the low-pressure region of the fuel-metering system is drawn.

According to another advantageous embodiment of the present invention, it is suggested that, as a reference pressure, the opening pressure of a pressure control valve or a pressure limiting valve of the fuel-metering system be applied in a specific operating state of the engine. A pressure control valve of the fuel-metering system is usually closed with a spring load without current being applied. The pressure control valve is therefore closed without electrical drive and opens at a pregiven pressure. This opening pressure can be dependent upon ambient parameters such as rpm of the engine, mass throughflow through the pressure control valve, ambient temperature, et cetera, but is basically known at a relatively high accuracy in specific operating states. Accordingly, for a direct injecting gasoline internal combustion engine, the opening pressure of the pressure control valve is known with an accuracy of approximately ±2.5 bar at idle rpm. The inaccuracies of the pressure sensor of the fuel-metering system usually lie significantly higher. When, during operation of the engine at idle rpm, the pressure control valve opens, it can be assumed that a pressure is present in the high-pressure region which corresponds approximately to the opening pressure of the pressure control valve. This pressure is then applied as a reference pressure for the adaptation of the sensor characteristic line.

A fuel-metering system having a high-pressure pump, which is controlled in response to demand, includes no pressure control valve; instead, the fuel-metering system includes only a passive overpressure valve (pressure limiting valve) having the same pressure valves as the pressure control valve with this overpressure valve being closed via spring loading. The method according to the invention can be carried out in the same way.

This further embodiment furthermore has the advantage that errors of the fuel-metering system can be detected during the operation of the engine. In the operation of the motor vehicle, the pressure control valve is switched so that no current is applied thereto (that is, it is closed) during specific operating states. The pressure, which adjusts in the high-pressure region, is measured and is compared to a desired value. This desired value is stored in the control apparatus of the engine in dependence upon various operating parameters and especially on the mass throughflow through the pressure control valve and the temperature of the pressure control valve. In the event the measured pressure deviates beyond a pregiven limit value from the desired value, it can be assumed that there is a defect in the fuel-metering system. Conceivable operating states for this function test are, for example, during an overrun cutoff or in an idle phase of the engine. To limit the influence of temperature on the function test, it is additionally conceivable to carry out the function test only within a pregiven temperature range. This is easily possible because the function test reacts to slow changes of the fuel-metering system and it is usually sufficient to carry out the function test once per trip.

According to a preferred embodiment of the present invention, it is suggested that the method be carried out automatically during the start operation of the engine after switching on the ignition and before the activation of the starter. During this time span, a prepressure is built up in the low-pressure region of the fuel-metering system by the presupply pump. No injection pressure is yet present in the high-pressure region.

It is furthermore suggested that the method be automatically carried out during the afterrun of the engine after the switchoff of the engine and before switching off the ignition. During the afterrun, no injection pressure is present any more in the high-pressure region of the fuel-metering system. The presupply pump continues to build up a prepressure.

Finally, it is suggested that the method be carried out after assembly or after a repair of the fuel-metering system of the engine especially after an exchange of the pressure sensor. With the aid of a suitable tester, the presupply pump can be driven in such a manner that it builds up a prepressure. The remaining elements of the fuel-metering system are driven in such a manner that no injection pressure is present in the high-pressure region and that the prepressure is conducted from the low-pressure region into the high-pressure region.

As a solution of the task of the present invention and starting from an arrangement for calibrating a pressure sensor of the kind mentioned initially herein it is further suggested that the arrangement includes means for carrying out the method according to the invention.

BRIEF DESCRIPTION OF THE DRAWINGS

A preferred embodiment of the present invention is explained in greater detail in the following with respect to the drawings wherein.

DESCRIPTION OF THE PREFERRED EMBODIMENTS OF THE INVENTION

Figure 1:
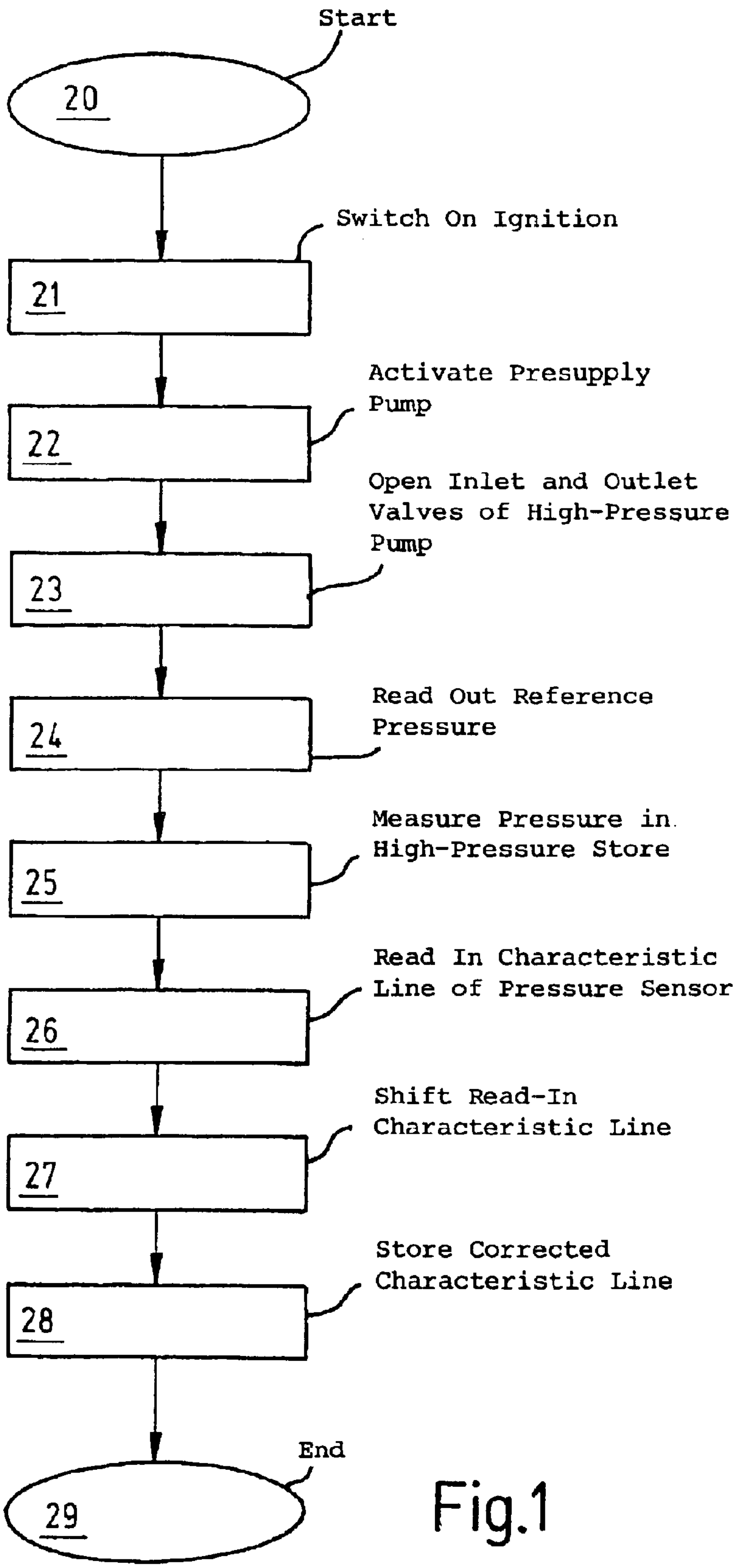
FIG. 1 shows a sequence diagram of a method of the invention in accordance with a preferred embodiment; and, FIG. 2 shows a fuel-metering system of an internal combustion engine wherein a pressure sensor is calibrated by means of the method according to the invention from FIG. 1.
Figure 2:
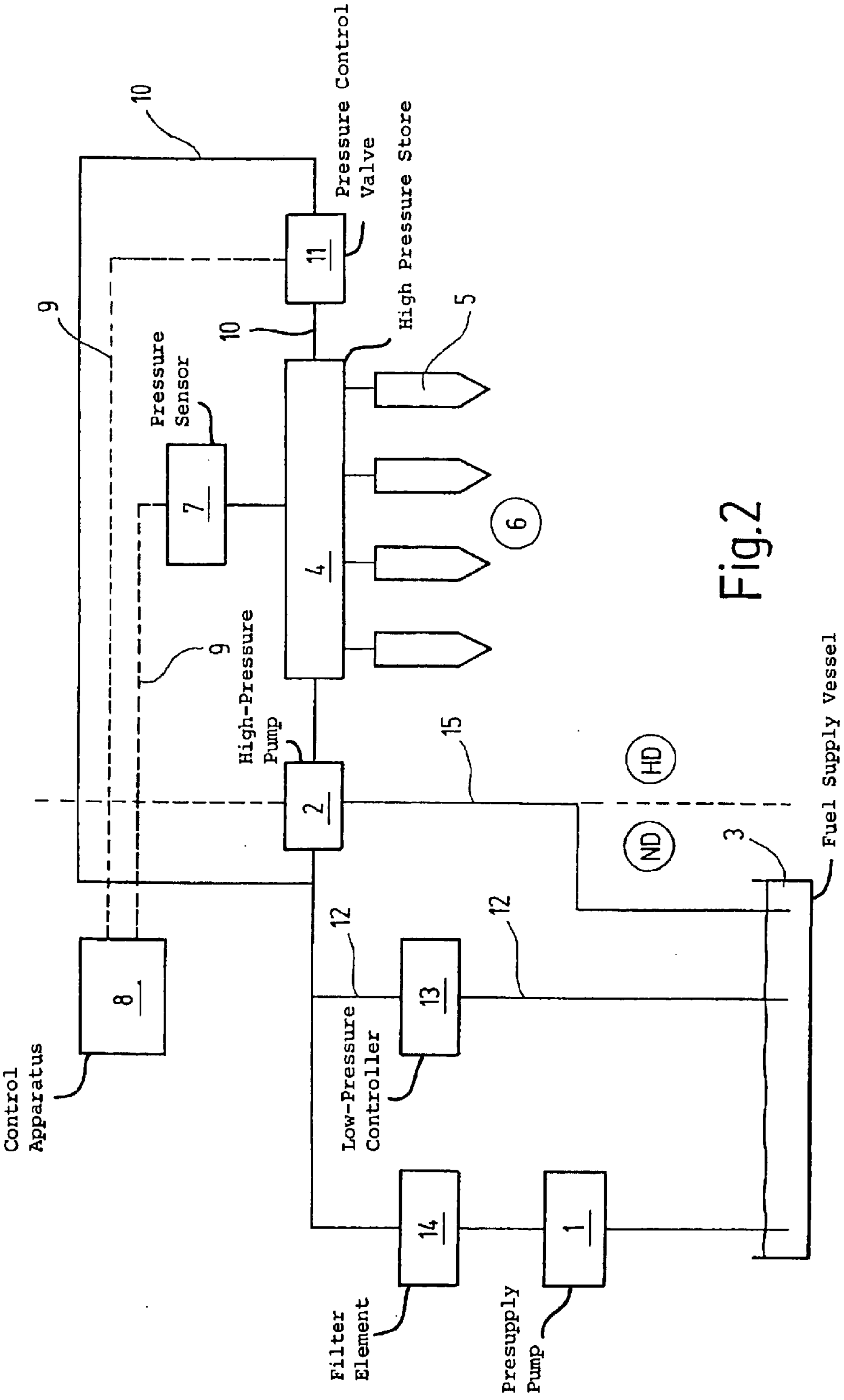

In FIG. 1, a sequence diagram of a preferred embodiment of a method for calibrating a pressure sensor of a fuel-metering system of an internal combustion engine is shown. FIG. 2 shows a fuel-metering system configured as a common-rail fuel direct-injection system. The system includes a presupply pump 1 and a high-pressure pump 2 controlled (open loop and/or closed loop) in accordance with demand. The presupply pump 1 is configured as an electric fuel pump and moves fuel from a fuel supply vessel 3 in a low-pressure region ND of the fuel-metering system. A pressure of approximately 4 bar is present in the low-pressure region ND.

The high-pressure pump 2 moves the fuel from the low-pressure region ND into a high-pressure store 4, the so-called rail, in a high-pressure region HD of the fuel-metering system. For gasoline fuel, a pressure of approximately 150 to 200 bar is present in the high-pressure store 4 and, for diesel fuel, a pressure of approximately 1,500 to 2,000 bar is present therein. Four injectors 5 branch from the high-pressure store 4 and are driven in dependence upon operating characteristic variables. For a corresponding control, the fuel is injected into the combustion chambers 6 of the engine from the high-pressure store 4 at the there present injection pressure.

In the high-pressure store 4, a pressure sensor 7 is mounted via which the injection pressure, which is present in the high-pressure store 4, is determined and a corresponding electrical signal is conducted to a control apparatus 8 of the engine. The signal lines 9 are shown in FIG. 2 as broken lines. Finally, a pressure control line 10 branches from the high-pressure store 4 of the fuel-metering system. This pressure control line 10 opens via a pressure control valve 11 into the low-pressure region ND.

A low-pressure line 12 branches from the low-pressure region ND of the fuel supply system and this line returns into the fuel supply vessel 3 via a low-pressure controller 13. A filter element 14 is mounted between the presupply pump 1 and the high-pressure pump 2. A leakage line 15 branches from the high-pressure pump 2 and leakage oil or leakage gasoline of the high-pressure pump 2 can flow back into the fuel vessel 3 via this leakage line 15.

The pressure sensor 7, as it is utilized in the fuel-metering system, has a static offset error, that is, the zero point is not reliably indicated. An offset error leads to the situation that the measurement value of the pressure sensor 7, especially in the low-pressure region, has relatively large deviations with respect to the actually present pressure value.

As a rule, a low pressure is present in the high-pressure store 4 in the starter phase of direct-injecting common-rail internal combustion engines. The internal combustion engine is mostly started with a low prepressure generated by the presupply pump 1 and only later is there a switchover to high pressure. The fuel mass, which is injected via the injectors 5 into the combustion chambers 6 is greatly dependent upon the injection pressure present in the high-pressure store 4. For this reason, this injection pressure should be taken into consideration in the computation of the injection time in the start phase of the engine. Because of the above-described inaccuracies of the pressure sensor 7, especially at low pressures, this is, however, mostly not possible. For this reason and according to the state of the art, the start of a direct injecting internal combustion engine, as a rule, takes place without the inclusion of the actual pressure present in the high-pressure region.

To increase the accuracy of the pressure sensor 7, the invention suggests a method for calibrating the pressure sensor 7 wherein a low pressure, which is present in the high-pressure region HD, is applied as a reference pressure. The reference pressure is known with a high accuracy or can be determined or measured with a high accuracy. The low pressure, which is present in the high-pressure region, is furthermore measured as a sensor pressure by the pressure sensor 7. After measuring the sensor pressure by the pressure sensor 7, a check is made as to whether the measured sensor pressure is within plausibility limits. The characteristic line of the pressure sensor 7 is then corrected in such a manner that the difference of reference pressure and sensor pressure is minimized.

There are many possibilities of determining the reference pressure with a higher accuracy than the sensor pressure can be measured. As reference pressure, the ambient pressure, for example, can be applied. Furthermore, the low pressure, which is present in the high-pressure store 4, can, however, also be generated by the prepressure pump 1. The prepressure pump 1 of the fuel-metering system is activated for this purpose. The prepressure pump 1 generates a prepressure in the low-pressure region ND. The prepressure is conducted from the low-pressure region ND into the high-pressure region HD in that the inlet valves and the outlet valves of the high-pressure pump 2 are opened. As a reference pressure, the pressure, which is adjusted in the low-pressure region ND at the low-pressure controller 13 of the fuel-metering system, is applied while considering the opening pressure of the inlet valves and the outlet valves of the high-pressure pump 2.

The low-pressure controller 13 of the fuel-metering system has an accuracy of approximately ±6% which corresponds to ±240 mbar at a prepressure of approximately 4 bar. The inlet and outlet valves of the high-pressure pump 2 have an accuracy of likewise approximately ±6% so that the reference pressure can be determined with an accuracy of at least ±500 mbar. A high-pressure sensor 7, which is mounted in a fuel-metering system of a direct-injecting gasoline internal combustion engine. has a measuring range of approximately 150 bar and this corresponds to an accuracy of approximately ±0.3%. The sensor pressure cannot be determined by the pressure sensor 7 with such a high accuracy.

It is also conceivable that the reference pressure is measured by a high-accuracy low-pressure sensor (not shown), which is mounted at least from time to time in the high-pressure region HD. Such a low-pressure sensor can be introduced for measuring the low pressure in the high-pressure store 4 and can then be removed after the measurement.

The method is preferably automatically carried out during the starting operation of the engine after switching on the ignition and in advance of the activation of the starter. During this time, the prepressure pump 1 is activated but no high pressure is yet generated in the high-pressure region HD. The inlet and outlet valves of the high-pressure pump 2 are usually configured as passive valves. The prepressure is conducted into the high-pressure store by the opening of the inlet and outlet valves of the high-pressure pump 2.

Alternatively, the method can also be automatically carried out during the afterrun of the engine after switching off the engine and in advance of switching off the ignition. During the afterrun, the ignition remains switched on and the control apparatus 8 runs the various functions of the vehicle down in a controlled manner. The presupply pump 1 must be driven in a targeted manner for carrying out the method during the afterrun and the inlet and outlet valves of the high-pressure pump 2 must be open.

The method of the invention is preferably carried out after the assembly or after a repair of the fuel-metering system of the engine, especially after an exchange of the pressure sensor 7.

It is also conceivable to carry out the method of the invention during the operation of the engine. For this purpose, the opening pressure of the pressure control valve 11 of the fuel-metering system can, for example, be applied as a reference pressure in a specific operating state of the engine.

The pressure control valve 11 is closed without the application of current with a spring biasing. The pressure control valve 11 is therefore closed when it is not electrically driven and opened at a pregiven opening pressure. The opening pressure can be dependent upon surrounding parameters such as the rpm of the engine, mass throughflow through the pressure control valve 11, ambient temperature, et cetera; however, the opening pressure is in specific operating states basically known with a relatively high accuracy. For example, in a direct-injecting gasoline internal combustion engine at idle rpm, the opening pressure of the pressure control valve 11 is known with an accuracy of approximately ±2.5 bar. The inaccuracies of the pressure sensor 7 of the fuel-metering system usually lie significantly higher. When the pressure control valve 11 opens during operation of the engine at idle rpm, it can be assumed that a pressure is present in the high-pressure store 4 which corresponds approximately to the opening pressure of the pressure control valve 11. This pressure is then applied as a reference pressure for the adaptation of the sensor characteristic line.

The method of the invention in FIG. 1 starts in the function block 20. In the next function block 21, the ignition of the vehicle is switched on. In function block 22, the presupply pump 1 is activated and, in function block 23, the inlet and outlet valves of the high-pressure pump 2 are opened. In function block 24, the reference pressure, which is present in the high-pressure store 4, is read out of a memory of the control apparatus 8. The reference pressure was in advance determined from the pressure, which is adjusted at the low-pressure controller 13, while considering the opening pressure of the inlet and outlet valves of the high-pressure pump 2 and was stored in the memory.

In a function block 25, the pressure, which is present in the high-pressure store 4, is measured by the pressure sensor 7. The characteristic line of the pressure sensor 7, which is stored in the memory of the control apparatus 8, is read in in a function block 26. In function block 27, the read-in characteristic line of the pressure sensor 7 is shifted in such a manner that the difference of reference pressure and sensor pressure is minimized. In function block 28, the corrected characteristic line is stored in the memory of the control apparatus 8. The method of the invention is then ended in function block 29.

The control of the engine by the control apparatus 8 takes place on the basis of the corrected characteristic line of the pressure sensor 7. The pressure sensor 7 now has an accuracy so high that the pressures, which are present in the high-pressure store 4, can be taken into the computation of the injection time of the injectors 5 also during the starting phase (with the then low pressures present in the high-pressure store 4).

What is claimed is:

1. A method for calibrating a pressure sensor of a fuel-metering system of an internal combustion engine wherein the fuel-metering system includes: a high-pressure pump f or moving fuel from a low-pressure region (ND) into a high-pressure region (HD); injectors for metering the fuel from the high-pressure region (HD) into combustion chambers of the internal combustion engine with the injectors being drivable in dependence upon operating characteristic variables; and, the pressure sensor being for measuring pressure in the high-pressure region (HD) and said pressure sensor defining a characteristic line and having a predetermined accuracy at which said pressure in said high-pressure region (HD) is measured, the method comprising the steps of:

generating a pressure in said high-pressure region (HD), which can be determined with a higher accuracy than said pressure sensor can measure, by activating a presupply pump of the fuel-metering system to generate a pressure in said low-pressure region (ND) and conducting said pressure in said low-pressure region (ND) into said high-pressure region (HD);

applying the pressure conducted into said high-pressure region (ND) as a reference pressure;

measuring the pressure present in said high-pressure region (ND) as a sensor pressure utilizing said pressure sensor;

forming a difference of said reference pressure and said sensor pressure; and, correcting said characteristic line of said pressure sensor so that said difference of said reference pressure and said sensor pressure is minimized.

2. The method of claim 1, wherein, after the measurement of the sensor pressure with the pressure sensor and before the correction of the characteristic line of the pressure sensor, a check is made as to whether the measured sensor pressure lies within pregiven plausibility limits.

3. A method for calibrating a pressure sensor of a fuel-metering system of an internal combustion engine wherein the fuel-metering system includes: a high-pressure pump for moving fuel from a low-pressure region (ND) into a high-pressure region (ND); injectors for metering the fuel from the high-pressure region (ND) into combustion chambers of the internal combustion engine with the injectors being drivable in dependence upon operating characteristic variables; and, the pressure sensor being for measuring pressure in the high-pressure region (HD) and said pressure sensor defining a characteristic line, the method comprising the steps of:

generating a pressure in said high-pressure region (HD) by activating a presupply pump of the fuel-metering system to generate a pressure in said low-pressure region (ND) and conducting said pressure in said low-pressure region (ND) into said high-pressure region (HD);

applying the pressure conducted into said high-pressure region (HD) as a reference pressure;

measuring the pressure present in said high-pressure region (HD) as a sensor pressure utilizing said pressure sensor;

forming a difference of said reference pressure and said sensor pressure;

correcting said characteristic line of said pressure sensor so that said difference of said reference pressure and said sensor pressure is minimized; and, wherein the pressure, which is adjusted in the low-pressure region at a low-pressure controller of the fuel-metering system, is applied as a reference pressure.

4. A method for calibrating a pressure sensor of a fuel-metering system of an internal combustion engine wherein the fuel-metering system includes: a high-pressure pump for moving fuel from a low-pressure region (ND) into a high-pressure region (HD); injectors for metering the fuel from the high-pressure region (HD) into combustion chambers of the internal combustion engine with the injectors being drivable in dependence upon operating characteristic variables; and, the pressure sensor being for measuring pressure in the high-pressure region (HD) and said pressure sensor defining a characteristic line, the method comprising the steps of:

generating a pressure in said high-pressure region (HD) by activating a presupply pump of the fuel-metering system to generate a pressure in said low-pressure region (ND) and conducting said pressure in said low-pressure region (ND) into said high-pressure region (HD);

applying the pressure conducted into said high-pressure region (HD) as a reference pressure;

measuring the pressure present in said high-pressure region (HD) as a sensor pressure utilizing said pressure sensor;

forming a difference of said reference pressure and said sensor pressure;

correcting said characteristic line of said pressure sensor so that said difference of said reference pressure and said sensor pressure is minimized; and, wherein the pressure is conducted from the low-pressure region (ND) into the high-pressure region (HD) via opened inlet and outlet valves of the high-pressure pump; the pressure, which is adjusted in the low-pressure region (ND) at a low-pressure controller of the fuel-metering system, is applied as a reference pressure while considering the opening pressure of the inlet and outlet valves of the high-pressure pump.

5. The method of claim 1, wherein the reference pressure is measured by a high-accuracy low-pressure sensor placed at least from time to time in the high-pressure region.

6. The method of claim 1, wherein the method is automatically carried out during the starting operation of the engine after switching on the ignition but in advance of activating the starter.

7. The method of claim 1, wherein the method is automatically carried out during the afterrun of the engine after switching off the engine and in advance of switching off the ignition.

8. The method of claim 1, wherein the method is carried out after the assembly or after a repair of the fuel-metering system of the engine, especially after an exchange of the pressure sensor.

9. An arrangement for calibrating a pressure sensor of a fuel-metering system of an internal combustion engine wherein the fuel-metering system includes: a high-pressure pump for pumping fuel from a low-pressure region into a high-pressure region (HD); injectors for metering fuel from the high-pressure region (HD) into combustion chambers of the engine with the injectors being controllable in dependence upon operating characteristic variables; and, the pressure sensor being for measuring the pressure in the high-pressure region (HD) and said pressure sensor defining a characteristic line and having a predetermined accuracy at which said pressure in said high-pressure region (HD) is measured, the arrangement comprising:

means for generating a pressure in said high-pressure region (HD), which can be determined with a higher accuracy than said pressure sensor can measure, by activating a presupply pump of the fuel-metering system to generate a pressure in said low-pressure region (ND) and conducting said pressure in said low-pressure region (ND) into said high-pressure region (HD);

means for applying the pressure conducted into said high-pressure region (HD) as a reference pressure;

means for measuring the pressure present in said high-pressure region (HD) as a sensor pressure utilizing said pressure sensor;

means for forming a difference of said reference pressure and said sensor pressure; and, means for correcting said characteristic line of said pressure sensor so that said difference of said reference pressure and said sensor pressure is minimized.

* * * * *

UNITED STATES PATENT AND TRADEMARK OFFICE

CERTIFICATE OF CORRECTION

PATENT NO. : 6,802,209 B2 
DATED : October 12, 2004
INVENTOR(S) : Klaus Joos et al.

It is certified that error appears in the above-identified patent and that said Letters Patent is hereby corrected as shown below:

Title page,
Item [56], References Cited, U.S. PATENT DOCUMENTS, delete "2002/0162536 A1 * 11/2002 Steinbrenner ....123/446" and substitute -- 2002/0162536 A1 * 11/2002 Steinbrenner et al ....123/446 -- therefor.
Item [57], ABSTRACT,
Line 6, delete "(HD)" and substitite -- (HD), -- therefor.

Column 8,
Line 50, delete "f or" and substitute -- for -- therefor.

Column 9,
Lines 2, 4, 21 and 22, delete "(ND)" and substitute -- (HD) -- therefor.

Signed and Sealed this

Eighth Day of February, 2005

JON W. DUDAS
*Director of the United States Patent and Trademark Office*